United States Patent [19]

MacKay et al.

[11] Patent Number: 5,351,161
[45] Date of Patent: * Sep. 27, 1994

[54] VARIABLE SCALE ROTARY SWITCH

[75] Inventors: Michael T. MacKay, Vallejo; Robert Duffy, Milpitas; Lee A. Cotterill, San Jose; William Herz, Newark; Joe McArdle, Mountain View, all of Calif.

[73] Assignee: Sony Electronics, Inc., Park Ridge, N.J.

[*] Notice: The portion of the term of this patent subsequent to Mar. 16, 2010 has been disclaimed.

[21] Appl. No.: 759,399

[22] Filed: Sep. 13, 1991

Related U.S. Application Data

[63] Continuation-in-part of Ser. No. 679,745, Apr. 3, 1991, Pat. No. 5,187,630.

[51] Int. Cl.$^5$ .................. G11B 33/00; G11B 15/50
[52] U.S. Cl. ..................................... 360/137; 360/10.3
[58] Field of Search ............ 360/137, 10.3, 71, 73.08; 192/84 C; 200/336, 564, 565, DIG. 34; 74/553

[56] References Cited

U.S. PATENT DOCUMENTS

| | | | |
|---|---|---|---|
| 4,425,520 | 1/1984 | Hiraga | 192/84 C |
| 4,428,005 | 1/1984 | Kubo | 360/137 |
| 4,455,886 | 6/1984 | Schmitt | 200/565 |
| 4,786,982 | 11/1988 | Wakahara et al. | 360/10.3 |
| 4,866,542 | 9/1989 | Shimada | 360/10.3 |
| 5,046,594 | 9/1991 | Kakinuma | 192/84 C |
| 5,128,503 | 7/1992 | Frantz | 200/336 |

OTHER PUBLICATIONS

Webster's Third New International Dictionary, (1961), p. 2210.

Primary Examiner—Paul M. Dzierzynski
Assistant Examiner—Richard Hanig
Attorney, Agent, or Firm—Irell & Manella

[57] ABSTRACT

A switch assembly that can vary at least two controllable parameters and can vary the upper, lower and any intermediary limits of the switch assembly. The switch assembly has a pair of nested coaxial rotary knobs each attached by shafts to sensors that determine the radial position of a reference point on each knob. The knobs rotate with respect to each other and are constructed to allow rotation of the knobs with one hand. The sensors are attached to the controls of the parameters, such that rotation of the knobs varies the output of the parameters. The sensors are coupled to a magnetic clutch that engages and prevents rotation of one of the knobs, when the knob is rotated into a predetermined radial position. A computer can be connected to the magnetic clutch and sensors. The computer receives input signals from the sensors and produces an output signal to the clutch, to engage the clutch and prevent rotation of the knob in accordance with a computer program.

32 Claims, 6 Drawing Sheets

VARIABLE SCALE ROTARY SWITCH

This application is a continuation-in-part of application Ser. No. 679,745 filed on Apr. 3, 1991 now U.S. Pat. No. 5,187,630 and incorporates by reference the subject matter of said application herein.

BACKGROUND OF THE INVENTION

1. Field of the Invention

This invention relates to rotary variable switches typically used to control the speed of a video cassette recorder.

2. Description of Related Art

When viewing or editing a prerecorded video tape, it is desirable to control the speed of the tape. Video editing equipment typically has a console with a plurality of control switches to vary the frame speed and the audio levels of the picture. In addition to the basic start and stop buttons, most consoles have knobs to control the shuttle speed (fast forward and reverse) and another switch to move the tape from frame to frame, commonly referred to as jogging. Typically, each function is controlled by a different knob. That is, there is usually a start/stop button, a separate knob to control shuttle speed and yet another knob to control the jogging of the film. It would be preferable to incorporate all of these functions in one switch so that the various operating parameters can be controlled by one hand or a pair of fingers, greatly reducing the complexity of use and freeing the other hand to control another function such as sound.

Most switches have upper and lower limits, which for rotary knobs is implemented by limiting the clockwise and counterclockwise rotational travel of the switch. In addition, such switches will have intermediary limits that define different scales within the range of the controlled function. For instance, audio equipment will have a volume knob that rotates and stops at 10, 20 etc, which define the varying levels of sound produced by the system. The upper and intermediary limits of the switch are usually determined and fixed when the unit is constructed. The upper or intermediary limits can not be changed once the switch has been assembled and installed into the equipment. It would be desirable to have a switch with limits that can be varied without mechanically changing the control. This would be particularly useful for a console that can be attached to both video and audio recording equipment, wherein the switch has certain predetermined limits and scales for an audio system and a different set of limits and scales for video equipment.

SUMMARY OF THE INVENTION

The present invention is a switch assembly that can vary at least two controllable parameters and change the upper, lower and any intermediary limits of the switch assembly. The switch assembly has a pair of nested coaxial rotary knobs each attached by shafts to sensors that determine the radial position of a reference point on each knob. The knobs rotate only with respect to each other and are constructed to allow rotation of the knobs with one hand. The sensors are attached to the controls of the parameters, such that rotation of the knobs varies the output of the parameters. The parameter may be the speed of a video tape or the sound level of an audio system. The sensors are coupled to a magnetic clutch that engages and prevents rotation of one of the knobs, when the knob is rotated to a predetermined radial position or positions. A computer can be connected to the magnetic clutch and the sensors. The computer receives input signals from the sensors and produces an output signal to the clutch, to engage the clutch and to prevent rotation of the knob in accordance with a computer program within the computer. The computer can be attached to a peripheral device such as a disk drive, whereby a user can change the limits of the switch assembly by inserting a different disk or selecting a prompt on a menu that contains a plurality of programs on a disk drive. This allows the limits to be easily changed, such that the switch assembly can be attached to various types of audio, video, recording or editing equipment, wherein each type of device has a different set of control limits.

In the preferred embodiment, the knobs are each attached by a shaft to another sensor that is also coupled to a parameter and the computer. The knobs can be used as a start/stop switch assembly, or to change the functions controlled by the knobs. The switch assembly has springs that allow the knobs to be pushed in a downward direction. Pushing each knob down activates the corresponding sensor, which sends a signal to the computer. For instance, one push on the button can start the equipment, two pushes to stop, three pushes could change one of the knob parameters from controlling frame speed to audio levels and so forth and so on.

Therefore it is an object of this invention to provide a switch assembly that can vary at least two parameters with one hand and that has an electrical clutch that prevents rotation of one of the knobs, when a reference point of the knob is in a predetermined radial position.

It is also an object of this invention to provide a rotary switch assembly that has outer and intermediary limits that can be varied by a computer program.

It is also an object of this invention to provide a video console with a single switch assembly that can control the shuttle speed, jogging speed, play speed, a start/stop button and an emergency stop button all in one switch assembly.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

A rotary switch assembly, which can vary at least two controllable parameters as well as change the upper, lower and any intermediary limits of the switch assembly, is disclosed. In the following description, for purposes of explanation, specific nomenclature is set forth to provide a thorough understanding of the present invention. However, it will be apparent to one skilled in the art that these specific details are not required in order to practise the present invention. In other instances, well known circuits and devices are shown in block diagram form in order not to obscure the present invention unnecessarily.

Figure 1:
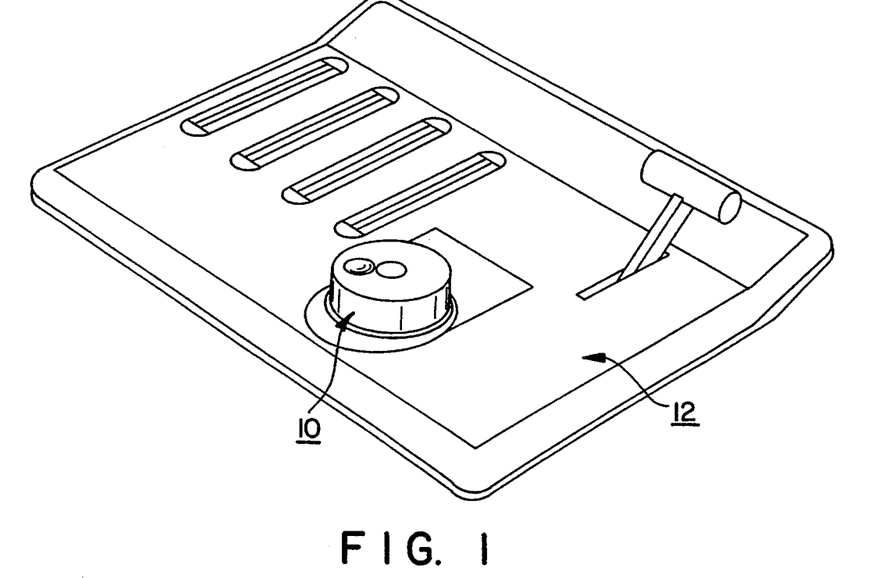
FIG. 1 is a perspective view of a console with a switch assembly of the present invention.

Referring to the drawings more particularly by reference numbers, FIG. 1 shows a switch assembly 10 that is operatively connected to a console 12. The console 12 can be connected to any device that has controllable parameters. For instance the device can be a video cassette recorder typically sold for use with a home television, or the device can be a motion picture editing machine wherein the individual frames of the picture are displayed at various speeds and directions, and stopped for viewing and editing. Although the switch assembly 10 to be discussed is used in a console that controls the motion and speed of a prerecorded video tape, it is to be understood that the switch assembly 10 can be used in any device or equipment that utilizes switches or other control members. To further explain the invention the parameters of a video cassette recorder (VCR) will be defined. Typically, a VCR will have a shuttle speed that is commonly referred to as fast forward and rewind. The shuttle speeds allow the video tape to be moved rapidly, in either a forward or reverse direction. Shuttle speeds will typically range from $+100X$ to $-100X$ for digital VCRs and $+50$ to $-50$ for analog units, where X is the normal speed of the tape. In addition to controlling shuttle speed, it is also possible to move the videotape frame by frame, wherein the speed of the frame to frame movement (known as jogging speed) can be varied. Also, as with every dynamic system there is a start and a stop button.

Figure 2:
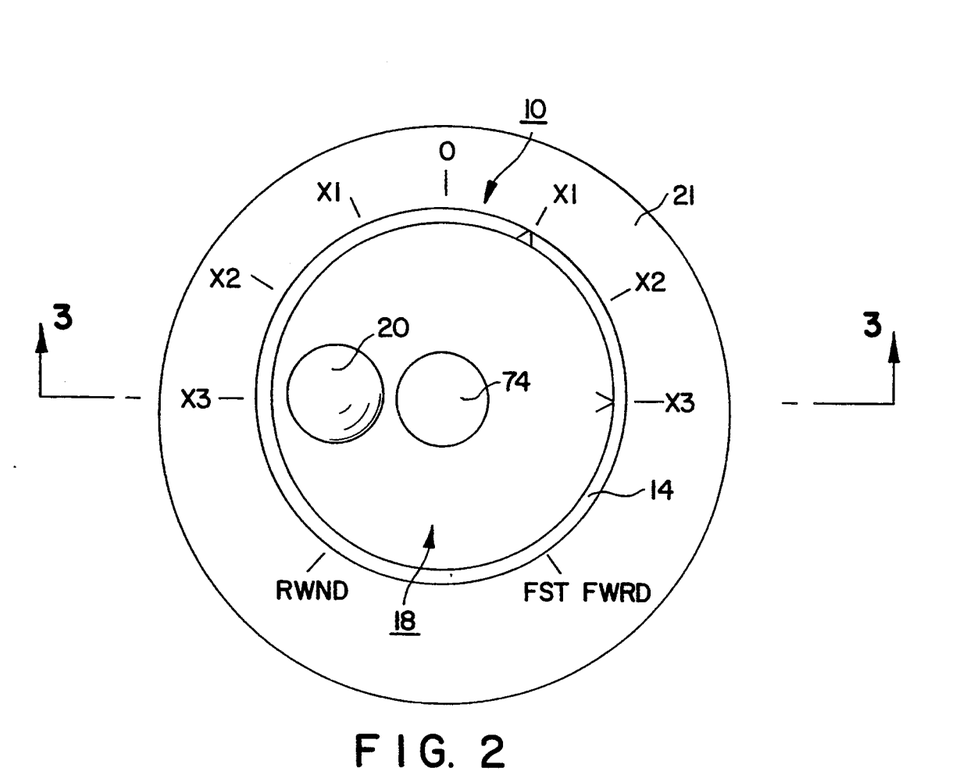
FIG. 2 is a top view of the switch assembly showing nested coaxial knobs that can only rotate relative to each other and a start button in the center.
Figure 3:
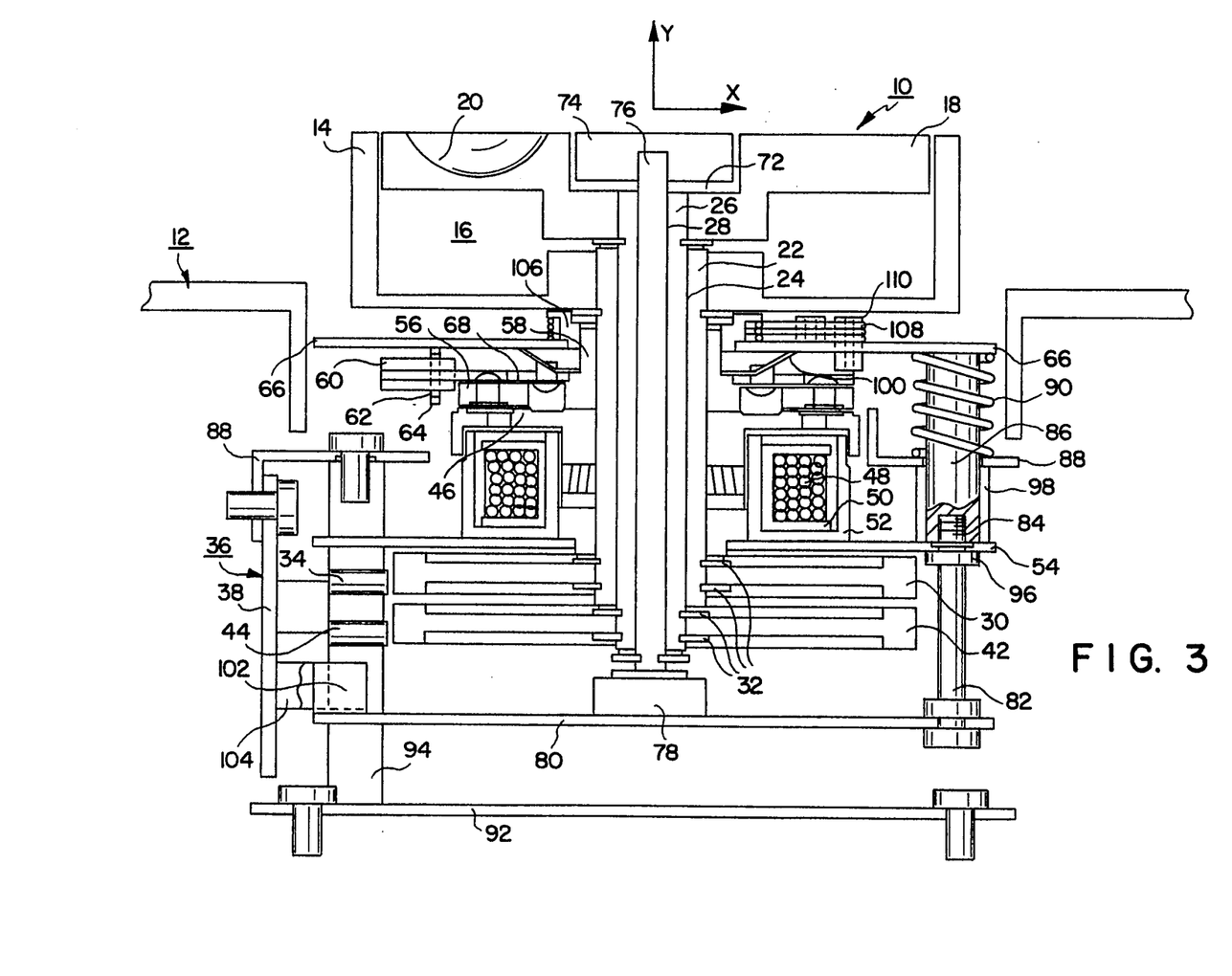
FIG. 3 is a side view of FIG. 2 showing coaxial shafts connected to the knobs and a pair of magnetically coupled sensors, the shafts connected to the Knobs move the plate that triggers an optical switch assembly.
Figure 4:
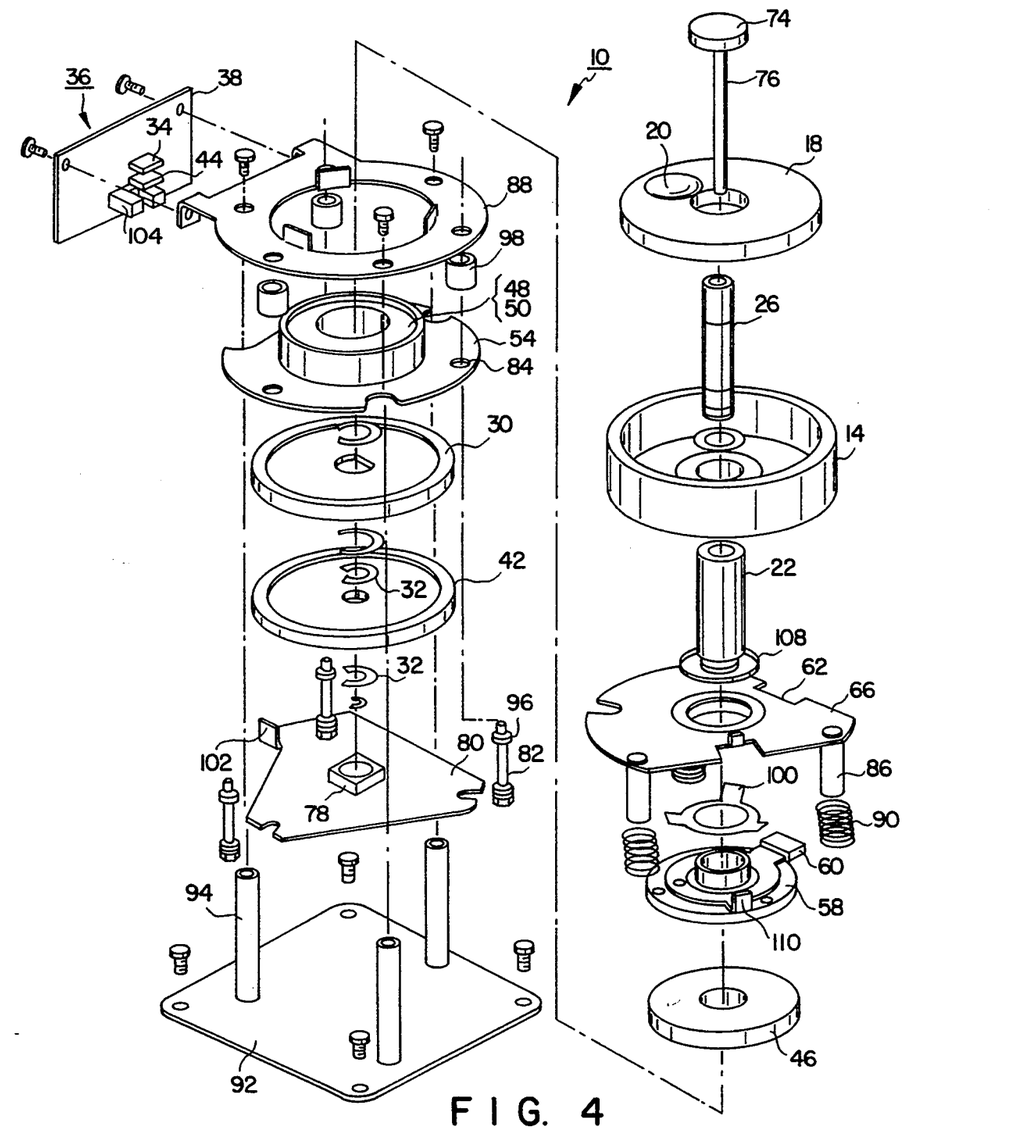
FIG. 4 is is an exploded perspective view showing the various parts of the switch assembly.

FIGS. 2-4 show the preferred embodiment of the present invention. The switch assembly 10 has a first knob 14 located above the console 12, so that the knob 14 can rotate relative to the console 12. The first knob 14 has an inner cavity 16, that allows a second knob 18 to be nested within the first knob 14. The second knob 18 can rotate relative to the first knob 14 and the console 12. The second knob 18 may have a finger detent 20 that allows rotation of the second knob 18 with the movement of a finger. The first knob 14 is also operable with fingers, such that both knobs may be turned with a single hand. As shown in FIG. 2, each knob may have an arrow or other indicator to signify a point of origin or reference point. The console 12 may have a template 21 to indicate the relative radial position of the reference points with respect to the console 12.

Referring to FIG. 3, the first knob 14 is connected to a first hollow shaft 22 that extends along a vertical axis y. The first shaft 22 has a bore 24 along the longitudinal axis and is attached to the first knob 14 such that the first shaft 22 rotates about the vertical axis with the rotation of the first knob 14. Connected to the second knob 18 is a second hollow shaft 26 with a bore 28 extending along the longitudinal axis of the second shaft 26. The second shaft 26 again being attached to the second knob 18 to rotate about the vertical axis along with the rotation of the second knob 18. At the end of the first shaft 22 is a first disk 42 attached to the first shaft 22 by a pair of retainer clips 32. The first shaft 22 preferably having a D shape in the lower portion, wherein the retainer clips 32 are C clips that engage the flat portion of the first shaft 22. The disk 42 is attached so that it rotates with the first shaft 22 and first knob 14.

Adjacent the first disk 42 is a first sensor 44 that senses the relative position of the first disk 42 and first knob 14. In the preferred embodiment, the first disk 42 is constructed to have a plurality of magnetic domains throughout the first disk 42, that correspond to different radial positions of the reference point of the first knob 14. The first sensor 44 is sensitive to the magnetic field of the magnetic domains such that when the first disk 42 rotates and a magnetic domain is immediately adjacent the first sensor 44, an electrical current is induced in the first sensor 44. Such a device, referred to as a Hall effect sensor, is known in the art and is commercially available. When a current is induced in the first sensor 44, the sensor sends an input signal to the circuit board 38 which communicates with a computer 36. At the end of the second shaft 26 is a second disk 30 attached by a pair of retainer clips 32. The second disk 30 is coupled to a second sensor 34 which again senses the relative radial position of the second disk 30 and the second knob 18. Although a Hall effect sensor has been described, it is to be understood that any type of sensor that can sense the relative radial position of the disk and the knobs can be used. For instance, the sensor might be a photosensitive cell and the disk may have a plurality of reflective surfaces along the periphery of the disk such that when the disk rotates, light emitted by the cell is either reflected or not reflected back to the cell depending on the position of the disk.

Attached to the first shaft 22 is an annular flange 46 that rotates with the first shaft 22 and first knob 14. Adjacent the annular flange 46 is a magnetic coil 48 wrapped around a bobbin 50 which is contained by a U shaped housing 52. The housing 52 is attached to a coil plate 54 which does not rotate with the shafts. Also adjacent the annular flange 46 is a clutch plate 56 that is attached to a clutch bracket 58. The clutch bracket 58 has a stop flange 60 that extends into a slot 62 between two flanges 64 of a retainer bracket 66, see also FIG. 4. The retainer bracket 66 is fixed relative to the shafts, wherein the stop flange 60 prevents the clutch bracket 58 and plate 56 from rotating with the shafts. Between the clutch bracket 58 and the clutch plate 56 is a spring 68. Normally there is a gap between the clutch plate 56 and the annular flange 46 so that the annular flange 46 can rotate relative to the plate 56. Both the clutch plate 56 and flange 46 are constructed from a magnetically inductive material such as steel. When a current flows through the coil 48, the coil 48 emits a magnetic field which flows through the flange 46 and clutch plate 56 and cause the two members to become pressed together. The engagement of the clutch plate 56 to the flange 46 connects the flange 46 to the stop flange 60. The movement of the stop flange 60 is limited by the slot 62 of the retainer bracket 66, thereby limiting the rotational movement of the shaft 22 and first knob 14.

Figure 5:
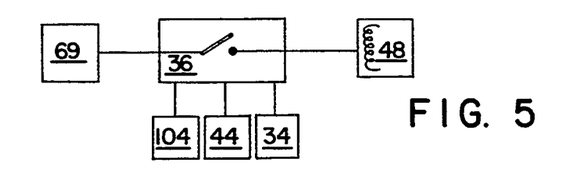
FIG. 5 is a schematic diagram showing the interrelationship of the sensors, the computer and the magnetic clutch.

A retainer bracket 100 is used to support the engaged clutch plate 56 with annular flange 46. As the clutch assembly is engaged, flange 110, which is connected to the clutch plate 56, interacts with torsional spring 108 to create a resistance in the radial motion of the knobs before the stop flange 60 has completely engaged with annular flange 46. This resistance provides the feel of the clutch function as opposed to an abrupt halt in the rotation of the knobs which would occur without such resistance. As shown in FIG. 5, the coil 48 receives current from a power supply 69 that is operatively connected to the computer 36, which has switching means to allow the coil 48 to draw power from the power supply 69.

In operation, the first knob 14 is rotated until a predetermined location of the first disk 42 is adjacent to the first sensor 44. The computer 36 typically has a counting means which counts every time a magnetic domain of the disk passes the sensor and sends an input signal to circuit board 38 and computer 36. Again, although a Hall effect sensor is described, any type of sensor could be used to sense the relative radial position of the disk and the knobs. The computer also has memory and processing means such that when a predetermined number of input signals are counted, the computer 36 causes the coil 48 to energize, which emanates a magnetic field that causes the clutch plate 56 to engage the annular flange 46. The engagement of the clutch connects the first knob 14 to the stop flange After the coil is energized, the first knob 14 can be rotated until the stop flange 60 reaches the end of the slot 62 and abuts against the retainer bracket 66. In the preferred embodiment, the range of knob 14 travel after the coil is energized is approximately ±5°. The switch assembly is typically constructed so that when the knob 14 is rotated from 0, the coil is immediately energized, wherein the knob 14 can be rotated another 5° before the stop flange 60 prevents further rotation. Such an embodiment can be used as a fast forward/reverse shuttle for visual editing equipment.

The computer 36 can be constructed to be programmable by the user of the switch assembly such that the limits of the switch assembly can be changed. For instance, a disk drive and keyboard interface may be attached to the computer to allow a user to insert new software that changes the limits of switch assembly. The software could be inserted by a "floppy" disk and/or the different programs can be stored on a hard disk, wherein the user can vary the limits by selecting a prompt or inputting new values. Referring to FIG. 2, one computer program may prevent the first knob 14 from moving the reference arrow past X1, while another program may allow rotation to X3. Yet another program could prevent the knob from rotating into rewind (counterclockwise of 0). The direction of knob motion relative to its effect is also programmable. This provides an advantage over switches in the prior art which had only one upper and lower limit. The varying limits allow the switch assembly 10 and console 12 to be used in both audio and video systems of different sizes and types.

The computer/clutch assembly can also be used to detent the knob as it is rotated relative to the console, providing incremental stops between the limits. Referring to FIG. 2 it can be seen that the first knob 14 can be rotated from 0 to a radial position designated X1. When the first knob 14 approaches X1, the computer 36 engages the clutch to slow down and stop the knob 14 from moving. The computer may have an internal timer that releases the clutch after a predetermined amount of time so that the knob can again be rotated. The cycle is repeated again when the knob approaches the radial position designated X2 and so forth and so on. The computer 36 can be reprogrammed such that the radial positions at which the switch assembly stops can be changed. It being understood that the detent characteristic can be combined with the outer limits discussed earlier. The computer 36 can also be connected to the means of varying the parameters. When a magnetic domain of a disk passes a sensor, the sensor will provide an appropriate output signal to vary the parameter. For example, if the second knob 18 is used to jog a video tape, the rotation of the second knob 18 and second disk 30 will provide a plurality of input signals to the computer 36, which further provides a plurality of output signals to change the controlled device, such as to change the speed or direction of the tape accordingly.

As shown in FIGS. 2 and 3 the second knob 18 may have an inner cavity 72 that houses a button 74. The button 74 is attached to a third shaft 76 that extends through the bore 28 of the second shaft 26. At the end of the third shaft 76 is a micromotion switch assembly 78 attached to a switch assembly plate 80. Connected to the switch assembly plate 80 are three retainer screws 82 that extend through clearance holes 84 in the coil plate 54 and thread into three plunger pins 86, see also FIG. 4. The plunger pins 86 are attached to the retainer bracket 66 which is spaced from a mounting bracket 88 by three helical springs 90. The mounting bracket 88 is attached to a lower mounting plate 92 by three mounting pins 94. The mounting plate 92 is fastened to the console 12, wherein the mounting bracket 88 and plate 92 are fixed with respect to the rest of the switch assembly. The circuit board 38 is also attached to the mounting bracket 88 such that all sensors attached to the circuit board 38 are fixed relative to the rest of the switch assembly. The retaining screws 82 may have a shoulder 96 to keep the coil plate 54 and the switch assembly plate 80 spaced apart a predetermined distance. The helical springs 90 bias the retainer bracket 66 toward the knobs. The plunger pins 86 may have coaxial bushings 98, that together with the retaining screw shoulders 96 prevent the retainer bracket 66 from being moved by the springs 90 beyond a predetermined distance.

The switch assembly plate 80 has a switch assembly paddle 102 that extends across an optical sensor 104 which is attached to the circuit board 38 and computer 36. The pushing of knobs 14 and 18 moves down the switch assembly bracket 80 such that the switch assembly paddle 102 is no longer blocking a light beam traveling across the optical sensor 104. The unblocking of the light beam produces an input signal to the computer 36. When knobs 14 and 18 are released, spring 90 pushes the switch assembly plate 80 and switch assembly paddle 102 back into the original position. The pushing down of knobs 14 and 15 could be used as an emergency stop.

Button 74 can be used to start and stop the parameters that are to be controlled. For instance, if the switch assembly is controlling the motion of a video tape, pushing the button 74 might initiate the playing of the video. The button 74 could also be used to change the parameters to be controlled by the knobs. For example, pushing the button 74 once might make the knobs control the motion of a video tape. Pushing the button 74 twice might allow the user to control the sound of the video tape with the second knob 18. Because the micromotion switch assembly 78 is connected to the computer 36 and board 38, the output function created by pushing the button 74 can be changed and the switch assembly 78 can operate as a separate switch assembly function.

The button 74 itself can pass parameters to the programs within the computer. Although a micromotion switch assembly 78 is described, it is to be understood that another similar sensor can be used, such a pressure transducer that would be sensitive to the downward force of the button 74.

The first knob 14 rests against the annular flange 106, and the annular flange 106 is also connected to the first shaft 22 by a retainer ring. When downward pressure is exerted on knobs 14 and 18, the annular flange 106 is depressed from the connection to the first shaft 22 and from the first knob 14. The depression of annular flange 106 causes a retainer bracket 66, plunger pins 86, and a switch assembly bracket 80 all to be pushed downward. The movement of switch assembly bracket 80 downward moves the switch assembly paddle 102 to create an input signal generated by the optical sensor 104 and input to the computer 36 as described above. The retraction of the brackets and knobs is accomplished by helical spring 90. The downward movement of the knobs can also be used as an emergency stop function to terminate the parameter that is being controlled by the knobs.

Thus what is described is a switch assembly that has two control knobs and two input buttons. When used in a console to control the motion of a video tape, the button 74 could be used to start the tape. The first knob 14 could be used to control the shuttle speed of the picture, wherein the speed can be adjusted from X1, X2, etc. The second knob 18 could control the jogging or the frame to frame movement of the picture. Finally, by pushing the knobs downward the tape can be stopped. When combined with the computer 36 all of the variables mentioned can be changed without mechanically changing the switch assembly.

Although a rotary switch assembly is described that is attached to a computer 36, it is to be understood that the switch assembly can be used without a computer. The sensors can be connected directly to the parameter control means and the power supply 69 of the coil 48. When a magnetic domain is rotated next to a sensor, the sensor closes the line between the power supply 69 and coil 48, energizing the coil 48 and stopping the knob. In this configuration, the sensors and disk act as a switch assembly for the coil. The disk may have two magnetic domains that represent the upper and lower limits of the switch assembly. The disk may further have magnetic domains for the intermediary positions between the outer limits, wherein there would be a timer in the sensor to deenergize the coil after the clutch is engaged a predetermined amount of time.

Figure 6:
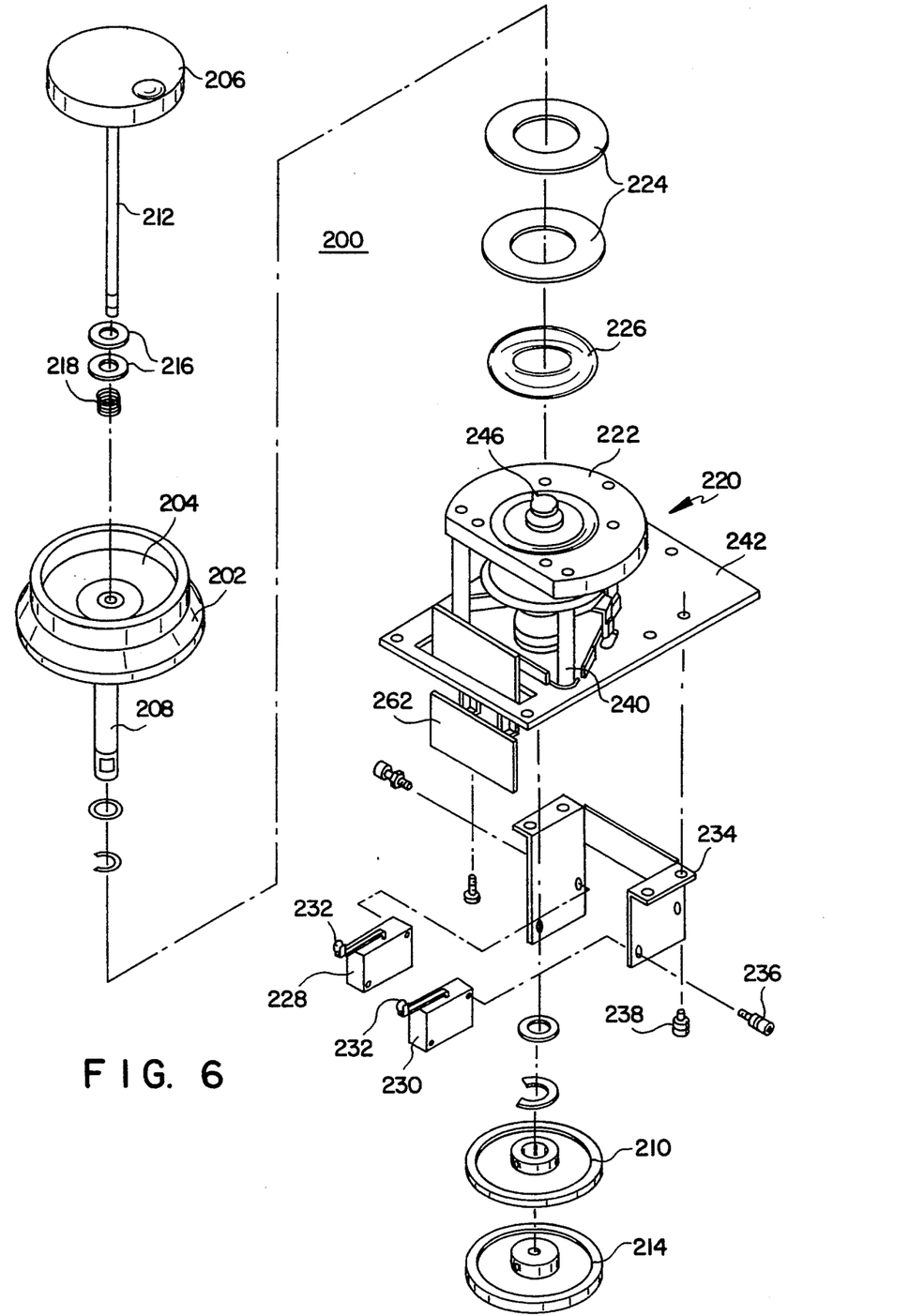
FIG. 6 is an exploded perspective view of an alternate embodiment of the switch assembly.
Figure 7:
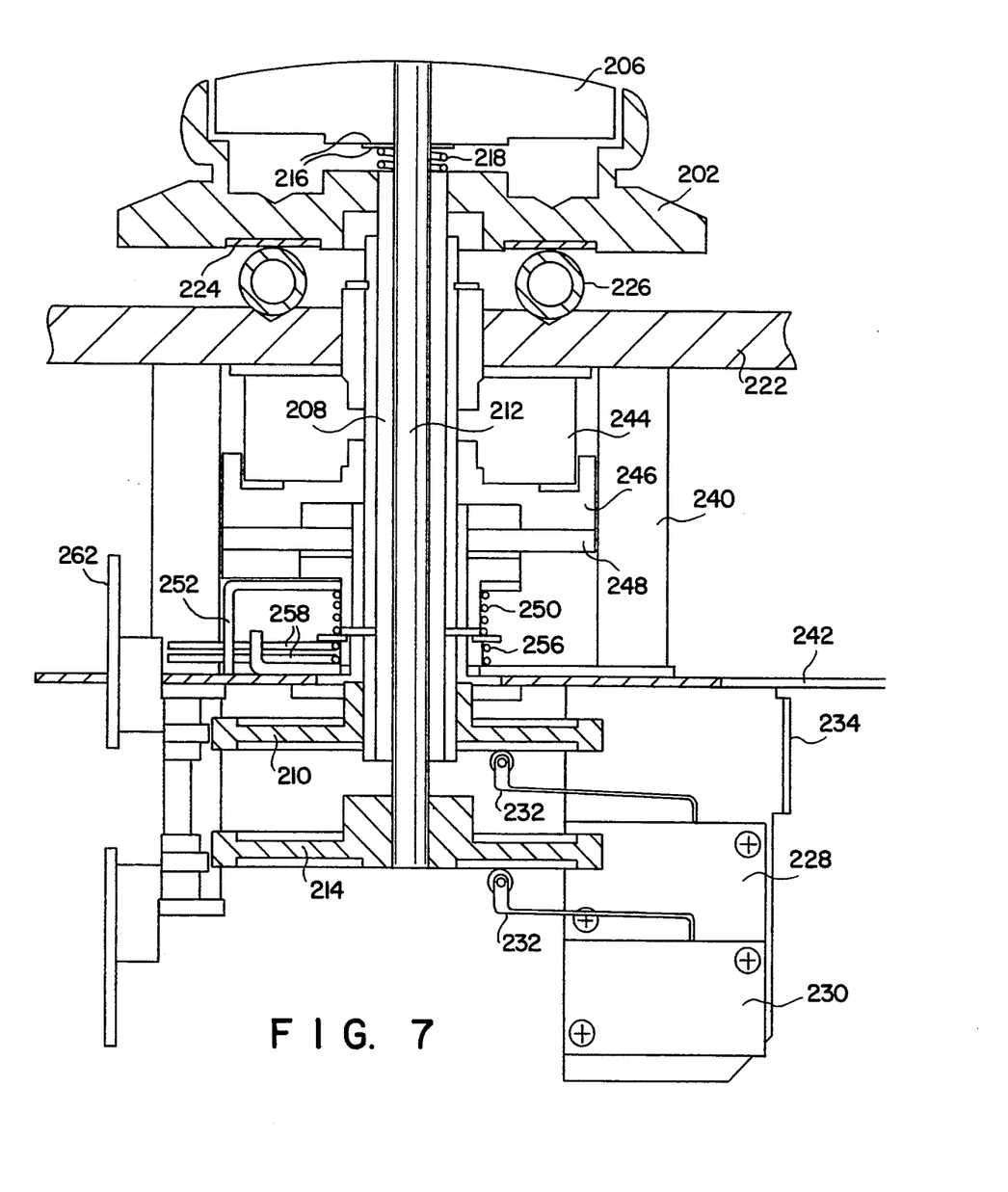
FIG. 7 is a side view of the switch assembly of FIG. 6 shown with the parts assembled.
Figure 8:
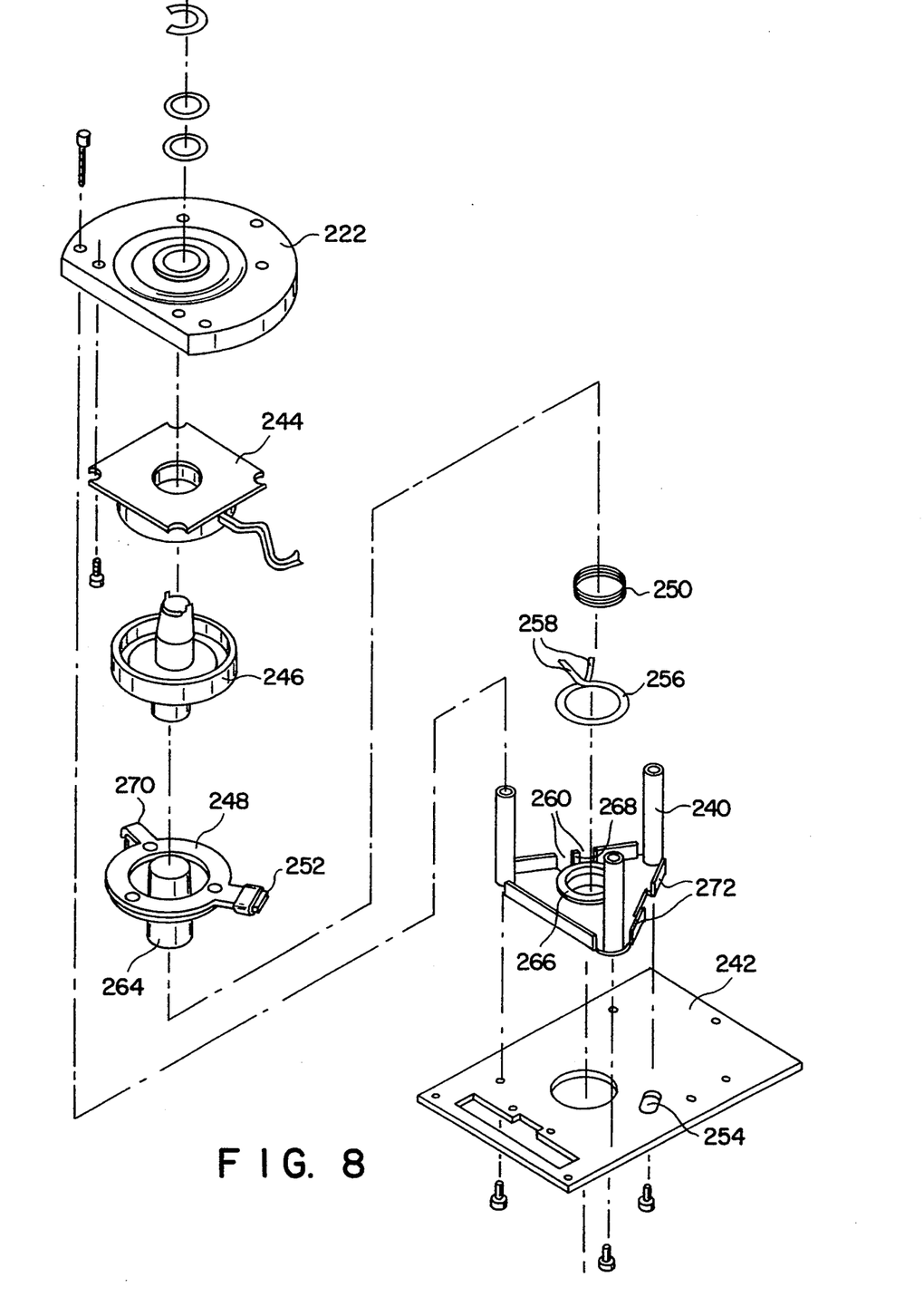
FIG. 8 is an exploded perspective view of the clutch assembly of the switch assembly of FIG. 6.

FIGS. 6-8 show another embodiment of the present invention The switch assembly 200 has a first knob 202 with an inner cavity 204 that allows a second knob 206 to be nested within the first knob 202. The first knob 202 has a hollow first shaft 208 that is attached to a first magnetic disk 210. The second knob 206 has a second shaft 212 that is coaxial with the first shaft 208 and is attached to a second magnetic disk 214. The magnetic disk 210 and 214, are coupled to sensors that sense the relative radial position of the knobs as described above.

Within the inner cavity 204 and between the knobs are a pair of washers 216 and a spring 218. The second knob 206 can be pushed into the inner cavity 204, wherein the spring 218 biases the second knob 206 back into the original position. The washers 216 allow the second knob 206 to be rotated relative to the spring 218 and the first knob 202. The washers 216 are preferably constructed from polytetrafluoroethylene commonly sold under the Trademark TEFLON, which reduces the friction and wear between the rotating members. Although a compression spring 218 is shown, the spring 218 may be an inflated hollow ring that will compress when pressure is applied.

The switch assembly 200 also has a clutch assembly 220 that is rigidly attached to the console (not shown). The assembly 220 has a mounting plate 222 that supports the first knob 202. Between the plate 222 and knob 202 are washers 224 and a spring 226. The first knob 202 can be pushed down toward the mounting plate 222, wherein the spring 226 will bias the knob 202 back into the original position. In the preferred embodiment, the spring 226 is constructed from an inflated hollow ring that will compress when pressure is applied. The washers 224 are preferably constructed from TEFLON and allow the first knob 202 to be rotated relative to the spring 226 and mounting plate 222.

As shown in FIG. 7, located below the first 210 and second 214 disk are first 228 and second 230 micromotion switches. Each switch assembly has a switch assembly lever 232 that activates the switch assembly when the lever 232 is pushed down. Pushing down on the first knob 202 will move the first disk 210, which will move the lever 232 and activate the first micromotion switch assembly 228. Likewise, when the second knob 206 is pushed down, the second disk 214 will move to activate the second micromotion switch assembly 230, accordingly. The springs 218 and 226, return the knobs to the original positions, allowing the levers 232 to move upward to deactivate the micromotion switches. The micromotion switches 228 and 230 can function in the same manner as the switch assembly 78 and sensor 104 of the previously discussed embodiment. The micromotion switches are connected to the computer, so that when the switches are activated by a downward movement of the disk, the switches send a signal to the computer. As shown in FIG. 6, the micromotion switches are rigidly attached to a switch assembly mounting bracket 234 by a pair of screws 236. The switch assembly mounting bracket 234 is connected to the clutch assembly 220 by screws 238.

As shown in FIG. 8, the clutch assembly 220 includes a spring mounting bracket 240 that is attached to a support plate 242. The mounting plate 222 is attached to, and spaced from, the support plate 242 by the mounting bracket 240. Attached to the bottom of the mounting plate 222 is a coil housing 244 that contains a magnetic coil (not shown). Beneath the coil housing 244 is a rotor 246 that extends through the mounting plate 222, so that the first knob 202 can be attached to the rotor 246, see FIG. 6. Adjacent to the rotor 246 is a clutch plate 248 that is separated from the mounting bracket 240 by a clutch spring 250, that holds the clutch plate 248 in place. The clutch plate 248 has a lower bearing 264 that fits within a bushing 266 of the mounting bracket 240 to align and hold the clutch plate 248. Both the rotor 146 and clutch plate 248 are constructed from a magnetically inductive material, typical a ferrite such as steel. The clutch plate 248 has a stop 252 that extends between two stop tabs 272 in the mounting bracket 240 and through a slot 254 in the support plate 242. The rotational movement of the clutch plate 242 is limited by the amount of travel of the stop 252 between the stop tabs 272.

Placed around the spacer housing bushing 266 is a spring 256 which has two ends 258 that extend into two slots 260. The spring ends 258 can move within the slots 260 about a spring stop 268. The clutch plate 248 also has a pin 270 that extends between the spring ends 258. The spring 256 provides a resistance when the coil is energized, allowing the knob 202 to be moved more slowly in the energized state. The spring 256 also centers the stop 252 between the stop tabs 272, when the coil is either deenergized or when the coil is energized and not manually operated.

The clutch operates similar to the clutch described above. When the first knob 202 reaches a predetermined radial position, the coil is energized and emits a magnetic field. The magnetic field causes the clutch plate 248 to engage the rotor 246. While the clutch is activated, the clutch plate 248 is secured to the rotor 246 and first knob 202. The rotation of the first knob 202 is limited by the amount of movement of the stop 252 between the stop tabs 272. The range of movement after the coil is energized is preferably ±5°, although it is to be understood that the range can be increased, or decreased down to zero.

When the clutch is engaged and the first knob 202 is rotated further, the pin 270 engages one of the spring ends 258, which apply a countertorque to the knob 202. The spring 256 applies a resistance to the first knob 202, so that rotation of the knob 202 can be more easily controlled by the user. Without the spring 256, a small torque applied to the know 202 would create a large rapid movement of the knob 202. With the spring 256, the user can more easily rotate the knob 202 in small increments. Additionally, the spring 256 moves the pin 270, clutch plate 248 and stop 252 to a center position when the coil is either deenergized or is energized and not manually operated. A circuit board 262 and accompanying electronics can be attached to the support plate 242, as shown in FIG. 6.

While certain exemplary embodiments have been described in detail and shown in the accompanying drawings, it is to be understood that such embodiments are merely illustrative of, and not restrictive on the broad invention, and that this invention not be limited to the specific constructions and arrangements shown and described, since various other modifications may occur to those ordinarily skilled in the art.

We claim:

1. A variable rotary switch assembly, comprising:
a first knob adapted to rotate about a vertical axis, said first knob having a first point of origin that rotates into a plurality of first radial positions about said vertical axis, said first knob being adapted to move from a first vertical position to a second vertical position;
a second knob within said first knob, said second knob being adapted to rotate about said vertical axis relative to said first knob, said second knob having a second point of origin that rotates into a plurality of second radial positions about said vertical axis, said second knob being adapted to move from a third vertical position to a fourth vertical position;
a hollow first shaft attached to said first knob that rotates with said first knob about said vertical axis, said first shaft extending along said vertical axis;
a second shaft attached to said second knob that rotates with said second knob about said vertical axis, said second shaft being coaxial with said first shaft;
first sensor means operatively connected to said first shaft for determining said first radial position of said first point of origin of said first knob;
second sensor means operatively connected to said second shaft for determining said second radial position of said second point of origin of said second knob;
third sensor means operatively connected to said first knob for sensing when said first knob is in said first and second vertical positions;
fourth sensor means operatively connected to said second knob for sensing when said second knob is in said third and fourth vertical positions; and,
magnetic clutch means operatively connected to said first shaft and said first sensor for engaging said first shaft when said first point of origin of said first knob is in a predetermined first radial position.

2. The switch assembly as recited in claim 1, wherein said third sensor is adapted to sense when said first knob is in said first and second vertical positions.

3. The switch assembly as recited in claim 1, wherein said third sensor means is a first micromotion switch assembly.

4. The switch assembly as recited in claim 1, wherein said fourth sensor means is a second micromotion switch assembly.

5. The switch assembly as recited in claim 1, wherein said magnetic clutch means engages said first knob each time said first point of origin of said first knob is rotated into one of a plurality of predetermined first radial positions.

6. The switch assembly as recited in claim 1, further comprising computer means operatively connected to said sensor means and said magnetic clutch means for receiving input signals from said first sensor means when said first knob rotates into said predetermined first radial position and producing output signals to said magnetic clutch means in accordance with operating instructions within said computer, said output signals cause said magnetic clutch means to engage said first shaft.

7. The switch assembly as recited in claim 5, further comprising computer means operatively connected to said sensor means and said magnetic clutch means for receiving a plurality of corresponding input signals from said first sensor means when said first knob rotates into said plurality of predetermined first radial positions and producing output signals to said magnetic clutch means in accordance with operating instructions within said computer, said output signals cause said magnetic clutch means to engage said first shaft.

8. The switch assembly as recited in claim 6, wherein said computer means is adapted such that said operating instructions can be changed to a new set of operating instructions.

9. The switch assembly as recited in claim 7, wherein said computer means is adapted such that said operating instructions can be changed to a new set of operating instructions.

10. The switch assembly as recited in claim 1, wherein said first sensor means includes a first disk attached to said first shaft, said first disk having at least one first magnetic portion corresponding to said predetermined first radial position, said magnetic portion of said first disk being capable of being magnetically coupled to a first magnetically sensitive sensor located in a position fixed relative to said first disk, said first magnetically sensitive sensor causing said magnetic clutch means to engage said magnetic clutch when said first knob is rotated into said first radial position and said first disk rotates such that said first magnetic portion is magnetically coupled to said first magnetically sensitive sensor.

11. The switch assembly as recited in claim 9, wherein said first sensor means includes a first disk attached to said first hollow shaft, said first disk having a plurality first magnetic portions corresponding to said plurality of predetermined first radial positions, said magnetic portions of said first disk being capable of being magnetically coupled to a first magnetically sensitive sensor located in a position fixed relative to said first disk, said first magnetically sensitive sensor creating said plurality of input signals when said first knob is rotated into said predetermined first radial positions such that said first magnetic portions become magnetically coupled to said first magnetically sensitive sensor.

12. The switch assembly as recited in claim 10, wherein said second sensor means includes a second disk attached to said second shaft, said second disk having at least one second magnetic portion corresponding to at least one predetermined second radial position, said second magnetic portion of said disk being capable of being magnetically coupled to a second magnetically sensitive sensor located in a position fixed relative to said second disk.

13. The switch assembly as recited in claim 11, wherein said second sensor means includes a second disk attached to said second shaft, said second disk having a plurality of second magnetic portions corresponding to a plurality of predetermined second radial positions, said second magnetic portions of said second disk being capable of being magnetically coupled to a second magnetically sensitive sensor located in a position fixed relative to said second disk, said second magnetic portions and said second magnetically sensitive sensor being magnetically coupled when said second knob is rotated into said predetermined second radial positions such that said second magnetic portions become magnetically coupled to said second magnetically sensitive sensor.

14. The switch assembly as recited in claim 1, wherein said magnetic clutch means includes a rotor attached to said first shaft such that said rotor rotates with said first shaft, a coil, and a clutch plate adapted to be coupled to said rotor, wherein when said first point of origin of said first knob is rotated into said predetermined first radial position, an electrical current is supplied to said coil by an electrical power means that induces a magnetic field in said coil, which causes said clutch plate to engage said rotor such that said rotor and said clutch plate are connected.

15. The switch assembly as recited in claim 14, wherein said clutch plate has a stop adapted to engage stop tabs, such that said first knob can only rotate a predetermined angle after said coil creates said magnetic field.

16. The switch assembly as recited in claim 15, wherein said magnetic clutch means includes a spring that wherein said predetermined angle is ±5°.

17. The switch assembly as recited in claim 15, wherein said magnetic clutch means includes a spring that becomes operatively connected to said first knob when said coil creates said magnetic field, such that said spring provides a resistance to said first knob rotation.

18. The switch assembly as recited in claim 10, wherein said magnetic clutch means includes a rotor attached to said first shaft such that said rotor rotates with said first shaft, a coil, and a clutch plate adapted to be coupled to said rotor, wherein when said first point of origin of said first knob is rotated into said predetermined first radial position, an electrical current is supplied to said coil by an electrical power means that induces a magnetic field in said coil, which causes said clutch plate to engage said rotor such that said rotor and said clutch plate are connected.

19. The switch assembly as recited in claim 18, wherein said clutch plate has a stop adapted to engage stop tabs, such that said first knob can only rotate a predetermined angle after said coil creates said magnetic field.

20. The switch assembly as recited in claim 19, wherein said predetermined angle is ±5°.

21. The switch assembly as recited in claim 19, wherein said magnetic clutch means includes a spring that becomes operatively connected to said first knob when said coil creates said magnetic field, such that said spring provides a resistance to said first knob rotation.

22. The switch assembly as recited in claim 12, wherein said magnetic clutch means includes a rotor attached to said first shaft such that said rotor rotates with said first shaft, a coil, and a clutch plate adapted to be coupled to said rotor, wherein when said first point of origin of said first knob is rotated into said predetermined first radial position, an electrical current is supplied to said coil by an electrical power means that induces a magnetic field in said coil which causes said clutch plate to engage said rotor such that said rotor and said clutch plate are connected.

23. The switch assembly as recited in claim 22, wherein said clutch plate has a stop adapted to engage stop tabs, such that said first knob can only rotate a predetermined angle after said coil creates said magnetic field.

24. The switch assembly as recited in claim 23, wherein said predetermined angle is ±5°.

25. The switch assembly as recited in claim 23, wherein said magnetic clutch means includes a spring that becomes operatively connected to said first knob when said coil creates said magnetic field, such that said spring provides a resistance to said first knob rotation.

26. The switch assembly as recited in claim 1, further comprising a first spring operatively connected to said first knob to bias said first knob into said first vertical position.

27. The switch assembly as recited in claim 26, further comprising a second spring operatively connected to said second knob to bias said second knob into said third vertical position.

28. The switch assembly as recited in claim 27, wherein said first spring is an inflated ring.

29. The switch assembly as recited in claim 1, wherein said first and second knobs control first and second parameters respectively, each parameter having varying scales, wherein said rotation of said knobs varies said scales of said first and second parameters.

30. The switch assembly as recited in claim 29, wherein said first parameter is a shuttle speed of a video tape and said second parameter is a jogging speed of said video tape.

31. The switch assembly as recited in claim 29, wherein said vertical movement of said first knob controls a third parameter having a varying scale, wherein said movement of said first knob from said first position to said second position varies said scales of said third parameter.

32. The switch assembly as recited in claim 31, wherein said first parameter is a shuttle speed of a video tape, said second parameter is a jogging speed of said video tape and said third parameter controls the movement of said video tape.

* * * * *